United States Patent Office 2,910,237
Patented Oct. 27, 1959

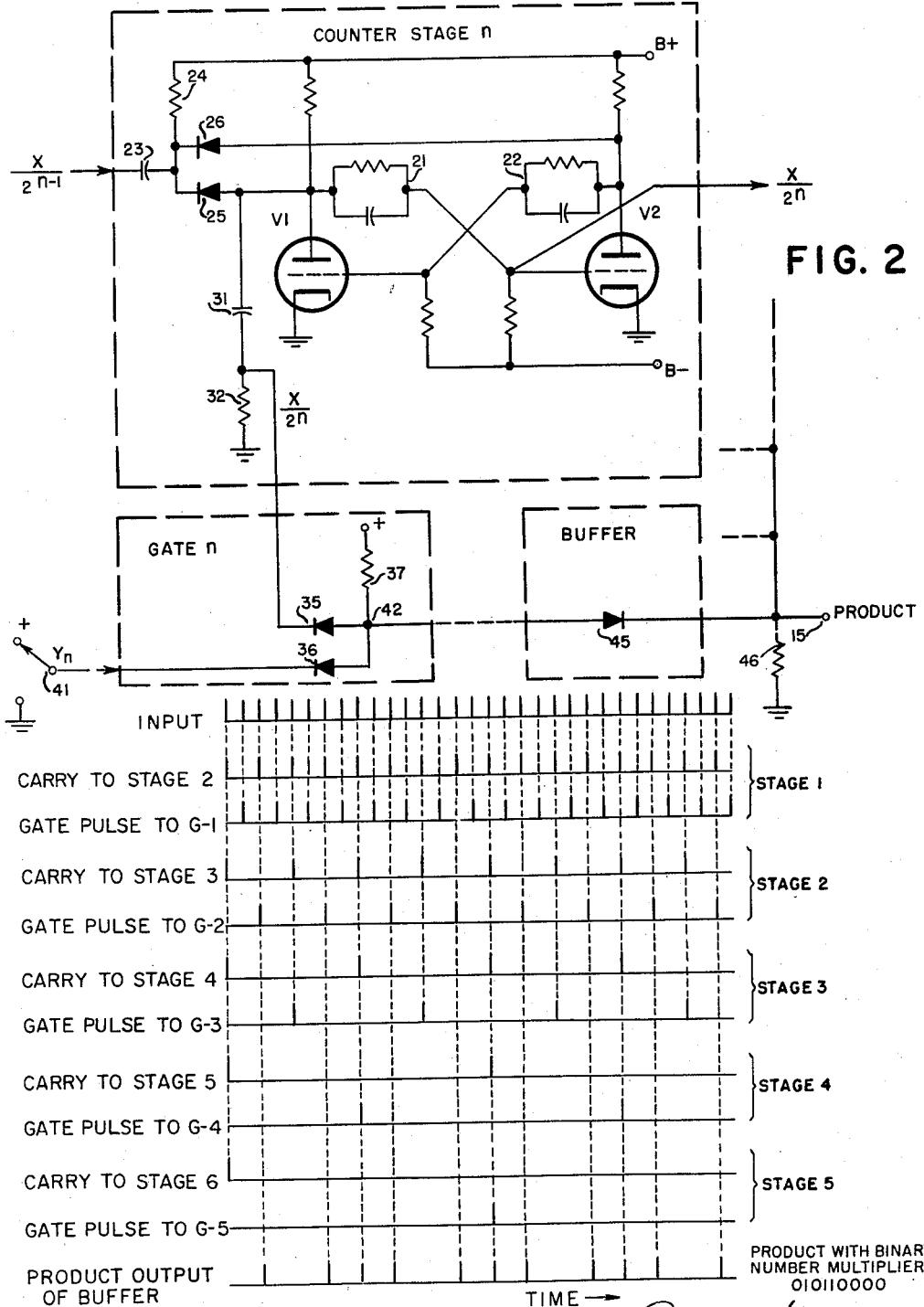

2,910,237

PULSE RATE MULTIPLIER

Maurice A. Meyer, Natick, and Bernard M. Gordon, Concord, Mass., assignors to Laboratory For Electronics, Inc., Boston, Mass., a corporation of Delaware Application December 5, 1952, Serial No. 324,312

8 Claims. (Cl. 235—164)

The present invention relates in general to electrical computation systems and more specifically concerns a novel multiplier circuit capable of continuously and reliably forming products of predetermined signals at exceptionally high speed, if required, with a minimum of conventional, dependable electronic components.

Within the broad subject classification of digital computers there have been described numerous forms of electronic multiplying circuits for yielding a digital output representing the product of two or more digitally expressed input numbers. The manner in which the input signals are represented often governs the ultimate choice of a multiplier. In the serial type, the multiplier receives simultaneously only a single digit from each of the multiplier and multiplicand, while in the so-called parallel systems all digits of both multiplier and multiplicand are introduced to the multiplier simultaneously. In some digital computing machines, both serial and parallel number representations are employed, and multipliers are available for operation under the control of such mixed signals. It is, however, characteristic of substantially all available digital multiplying systems, irrespective of whether serial or parallel notation is used, that both multiplier and multiplicand are necessarily expressed as a definite number of digits, and that the product is correspondingly a number of a fixed quantity of digits, each represented electrically.

The problems involved in electrical computation are somewhat different if one of the input signals is a train of pulses, the number of pulses per unit time being representative of a first quantity; while the other input signal represents a binary number having a prescribed number of digits. To illustrate the need for computation under these circumstances, consider a continuous wave Doppler radar system where the frequency deviation of whose return continuously indicates the relative radial velocity between the radar installation and the reflecting target, and where it is necessary to multiply this velocity by a fixed or variable quantity available in digital form within the radar system. A pulse train representing frequency deviation may be generated by a suitable discriminator, such as the circuit disclosed in the co-pending application of Bernard M. Gordon, entitled Digital Discriminator, Serial No. 319,571, filed November 8, 1952, now Patent No. 2,858,425, or similar circuit. In order to use already known techniques to find the desired product, it would first be necessary to convert the pulse train into a digitally expressed binary number of a fixed number of digits, and furnish this number together with the one already in digital form to the multiplier to form the product. Such procedure is obviously costly of equipment, and the conversion process may adversely affect overall accuracy.

The present invention contemplates and has as a primary object the provision of a multiplier capable of furnishing a continuous response representing the product of a number available in some digital system of notation and a quantity represented by the number of events per unit time of an input signal such as a pulse train. Although the sources of multiplier and multiplicand are not in themselves essential to the invention, the first of these is preferably taken in parallel binary notation and the second from a discriminator as noted above, or, from any pulse or alternating signal source whose instantaneous frequency is indicative of a quantity under consideration. In accordance with the inventive concepts here disclosed, a continuous, self-coding process is effected whereby a first quantity represented by the number of events per unit time of the input signal, is operated upon within the multiplier by the signal in binary form representing a second quantity, to provide an output signal having a number of events per unit time representative of the product of the first and second quantities.

Generally speaking, the continuous coding, referred to above is achieved by energizing a series of cascaded binary counter stages by the input signal, and applying the output of each stage to a corresponding number of gate circuits which are either open or closed in accordance with the polarities of the binary multiplier potentials. The desired product is derived as the electrical combination of gate circuit outputs, provided that, as disclosed herein, no two gate circuits are permitted to pass output signals simultaneously.

It is therefore another object of this invention to provide a multiplier which includes means for effectively coding a pulse train for interaction with a binary number expressed as a system of parallel potentials, all simultaneously available.

Another object of the present invention is to provide means for altering a pulse rate by a multiplier.

A further object of this invention is to provide novel means for gating through the outputs of all stages of a cascade counter in accordance with the dictates of a binary multiplier.

A still further object of this invention is to provide novel means for timing the outputs of counter stages for actuation of multiplier gates whereby all output signal pulses are properly sequenced to preclude error or ambiguity.

These and other objects of the present invention will now become apparent upon consideration of the following detailed specification in connection with the accompanying drawing in which:

Fig. 2 is a schematic diagram of principal elements shown in the block diagram of Fig. 1; and Fig. 3 is a graphical representation of the pulse timing sequence of the counter illustrated in Figs. 1 and 2.

Figure 1:
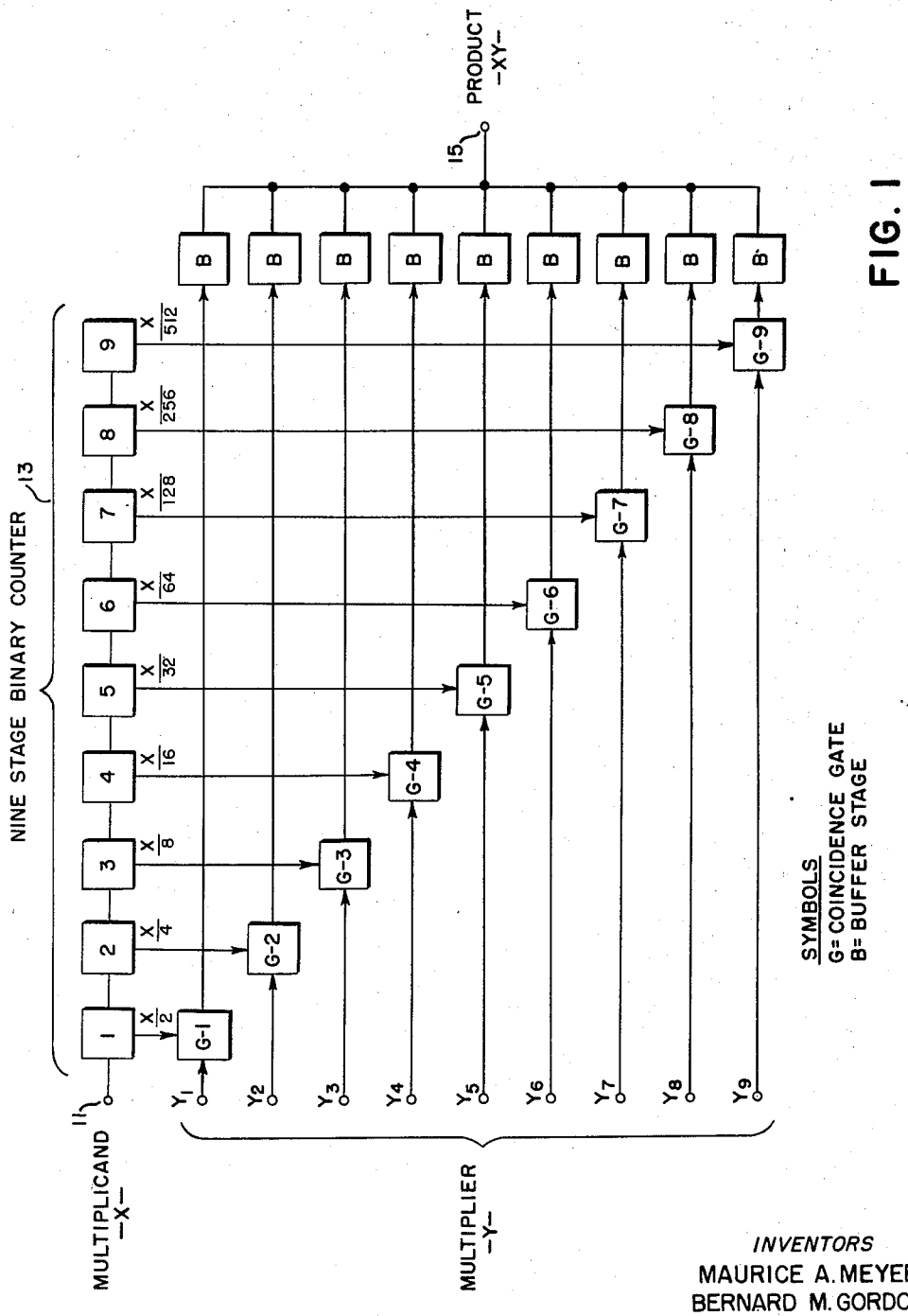
Fig. 1 is a block diagram showing the logical arrangement and interconnection of elements, functionally identified, capable of forming the required product.

With reference now to the drawings and more particularly to Fig. 1 thereof, there is illustrated the combination and interconnection of circuit elements forming a multiplier incorporating the principles of this invention. The multiplicand herein designated as X is applied at terminal 11 as a pulse train whose repetition rate instantaneously is related to the absolute value of a particular quantity. There is basically no limitation on the waveform of this so-called pulse train; it simply must be capable of being counted cyclically. Thus, the input signal X may be in the form of a sequence of spaced, sharply defined potential spikes of some polarity, or it may simply comprise a sinusoidal or square wave of fixed or fluctuating frequency.

In the specific aspect of the invention disclosed in Fig. 1, the multiplier signal, bearing the notation Y, is applied in binary form to a parallel array of nine terminals $Y_1$, $Y_2, Y_3, \ldots Y_9$, each associated with a digit of consecutively decreasing significance of a nine-digit binary number, $Y_1$ corresponding to the most significant digit. Each of these terminals is either energized at a preselected potential or is grounded, depending on whether the associated digit of the binary number multiplier is 1 or 0 respectively. The parallel activating potentials for the nine multiplier terminals are derived from some suitable binary source (not shown) and these potentials may be fixed to represent a scale factor, or may in themselves be variable as a function of time.

Returning now to a consideration of the application of the multiplicand X, it is seen that this signal is used to energize the input of a cascaded binary counter 13, having a number of individual stages to correspond with the number of binary multiplier terminals, which in this instance is nine. Two distinct signals are derived from each counter stage; one of which is used as a carry to trigger the stage immediately following, while the other represents the binary count of that stage. These weighted counts, it will be observed, are marked appropriately as X/2, X/4, ... X/512. No carry is required from the output of the final stage.

The weighted output of each counter stage is directly applied to a corresponding one of nine coincidence type gate circuits identified on the drawing as G–1, G–2, ... G–9, which gates are either open or closed, as determined by whether the correspondingly numbered binary multiplier terminal coupled to that gate is activated or not.

Each gate circuit output is coupled through an individual buffer circuit B, the function of which is to preclude interaction of gate circuit outputs, and the outputs of all buffer stages are then combined in parallel at output terminal 15, which furnishes an output signal having a number of events per unit time representative of the product of X and Y.

Prior to proceeding with a more detailed analysis of multiplier operation, the nature of the circuitry capable of performing the functions outlined will be discussed. With reference now to Fig. 2, there is shown a schematic circuit diagram of each of the basic elements treated in the preceding block diagram. So that the treatment of circuits might be quite general, the $n$th stage of counter 13 and the $n$th gate circuit, i.e., gate G–$n$, have been drawn together with the associated buffer and input and output terminals. For assistance in setting the circuits shown in Fig. 2 into the pattern of Fig. 1, the counter, gate, and buffer stages have correspondingly been enclosed in blocks.

Specifically, the $n$th counter stage comprises a single flip-flop formed of triode electron tubes V1 and V2, wherein the plates are resistively connected to a positive potential source B+ and the cathodes grounded. The plates and grids of the triodes are cross-coupled by resistance-capacitance networks 21 and 22, and the grids are additionally resistively connected to a negative potential source B−. The input signal is applied to the stage through a differentiator formed of capacitor 23 and resistor 24 and through diodes 25 and 26 to the plates of tubes V1 and V2, respectively.

As previously noted in connection with Fig. 1, two independent outputs are taken from each counter stage. This is shown in Fig. 2, where the first output is taken from the plate of tube VI through a differentiator formed of condenser 31 and resistor 32, and the second from the grid of tube V2. For the counter stage shown, the input signal occurrences may be represented by $$\frac{X}{2^{n-1}}$$

For each negative signal appearing across differentiator resistor 24, negative triggers will be applied to both plates. If it is assumed that tube VI is initially conducting and V2 is initially cut off, then the negative trigger input will have the effect of reversing this state and will provide a positive going square wave output at the plate of tube VI. The next negative trigger appearing across resistor 24 will restore the initial state of conduction and non-conduction in tubes V1 and V2, respectively, and provide a negative going signal output from the grid of tube V2. This negative going signal is differentiated in the succeeding stage to provide a negative trigger or carry pulse therein. Both output signals may be represented by one half the input, or $$\frac{X}{2^n}$$

Thus, for counter stage $n$, an output from one tube furnishes the gate circuit input, while the output from the other tube furnishes the carry to the next consecutive counter stage. For the flip-flop shown, two input pulses from the preceding stage are required to complete a cycle of operation. In the specific arrangement disclosed in Figs. 1 and 2 the first of these two input pulses generates an output to the gate, with no carry output; while the second input signal generates a carry output to the next stage, with no significant gate input signal. Evidently then, gate signal inputs may be generated in any stage of the cascaded counter only within the intervals between carries; or otherwise stated, in each stage carries and gate input pulses are generated alternately. The full advantage of this interlaced signal timing scheme will be set forth later in the discussion of Fig. 3, and the specific numerical example presented therewith.

Coincidence gate $n$ comprises essentially a pair of similarly poled diodes 35 and 36, both anodes of which are coupled through common resistor 37 to a positive potential source. The cathode of diode 36 is energized by the binary input potential at terminal $Y_n$, and to facilitate explanation, switch 41 which may be used to connect terminal $Y_n$ to a positive potential or to ground is shown connected to this point. In effect, the switch 41 and its associated potentials represent the binary multiplier source. It will be understood that when this binary input line is activated, terminal $Y_n$ is connected to the positive switch point, otherwise it is grounded.

The operation of the gate circuit is briefly as follows: With either or both of the diode cathodes at a low potential, or ground, junction 42 will also remain at a comparatively low potential due to diode conduction. However, if the cathodes of both diodes are simultaneously made positive, the potential at junction 42 will rise sharply to deliver an output signal. When, as shown in the drawing, terminal $Y_n$ is activated by the application of a positive potential thereto, positive pulses appearing across resistor 32 will also appear at junction 42. If terminal $Y_n$ is grounded instead, then positive signals appearing across resistor 32 will be ineffective and will not be transferred through the gate.

The gate output at junction 42 is directly coupled to the buffer or isolating stage which, in its simplest form, is a diode 45 poled for the transfer of positive pulses through a common load resistor 46 to the output terminal 15.

Reviewing the operation of the $n$th stage as shown in Fig. 2, it will be observed that if the binary line at terminal $Y_n$ is made positive, all pulses appearing across resistor 32 and representing the output subevents of the $n$th counter stage will be transferred in the same time sequence through the buffer to output terminal 15. If, on the other hand, terminal $Y_n$ is grounded, no output from terminal 15 is obtained from the $n$th stage. However, the $n$th counter stage continues to be effective in transferring carries through to the succeeding stages to continue the count.

At this point, reference is once again made to Fig. 1 for an analysis of the operation of the overall multiplier system. Consider the multiplicand X as a number of occurrences, and assume that the number of occurrences is to be multiplied by another number Y, where Y is less than unity, and is expressed in binary rotation. By applying the multiplicand to the nine cascaded binary counter stages, weighted outputs of X/2, X/4, . . . X/512 subevents are continuously obtained and applied to the corresponding gates. The multiplier Y is also applied to these gates in binary form and where a gate is simultaneously actuated by multiplier and multiplicand signals, it will pass through the buffers and to the output terminal 15, the corresponding weighted counter output. The combination of all gate outputs will furnish the product of multiplicand and multiplier at terminal 15, provided that no two subevents occur at the same time on the lines coupling the individual counter stages to the correspondingly numbered gates.

Analytically, the sub-product $P_n$, equal to the number of subevents, delivered by the $n$th gate may be expressed as:

$$P_n = \frac{X}{2^n} Y_n$$

where $Y_n$ represents the digit of $n$th significance in the binary number representative of the quantity Y and determines the effect of the $n$th multiplier terminal. $Y_n$ is either one or zero and determines respectively whether the corresponding line is activated or not. The final product P is simply the summation of all sub-products:

$$P = \sum_1^n P_n = \sum_1^n \frac{X}{2^n} Y_n = X \sum_1^n \frac{Y_n}{2^n}$$

Since the number of input events X corresponds to a first quantity independent of $n$, it may be moved outside the summation sign as indicated. Then, by recognizing that the desired product is XY, and matching coefficients in the equations $$P = XY = X \sum_{n=1}^n \frac{Y_n}{2^n}$$

the following relation is obtained:

$$Y = \sum_1^n \frac{Y_n}{2^n}$$

Thus each term $$\frac{Y_n}{2^n}$$

represents the contribution of each digit in the binary number representation of the number Y, characteristic of a second quantity.

As an example of such multiplication, if the input X were to be multiplied by 0.653, the nearest binary multiplier would be 101001110 and only terminals $Y_1$, $Y_3$, $Y_6$, $Y_7$, and $Y_8$ are activated while the remaining terminals are grounded. The activated lines would represent decimal contributions of $0.5 + 0.125 + 0.016 + 0.008 + 0.004$, respectively. Therefore the number of output events at terminal 15 will be equal to 0.653X. As X represents a number of input events per unit time, the number of output subevents at terminal 15 during the same per unit time interval represents the desired product XY.

The accuracy of the multiplier illustrated in Fig. 1 should be considered. If an $n$ stage counter is used together with $n$ input lines and gates, the input number at terminals $Y_1 \ldots Y_9$ may be represented to within an absolute value of $\pm \frac{1}{2}^{n+1}$. If $n$ is equal to 9, as shown in Fig. 1, then an accuracy of 0.1% may be achieved. Greater or lesser accuracy as required may be achieved by respectively increasing or decreasing the number of stages in the system.

At various points in the preceding discussion, it has been indicated that it is essential to operation of the system that no two pulses occur simultaneously on the lines connecting the counter stages to the respective gates. This is, of course, evident since the output product is represented as the sum of a number of time sequenced pulses. In the conventional type of cascaded binary counter, carries from stage to stage are generally propagated by the same pulses that are read out of a stage. In such arrangements, when a pulse appears on the output line of the $n$th stage, it must also appear on the lines of all previous stages. For a multiplier as in Fig. 1, a counter of the conventional type would, therefore, result in error due to the merging of output pulses from the gate circuits.

In Fig. 2, it was shown that the carry signal was propagated from the grid of triode V2 while the gate signal was taken from the plate of triode V1 and that consequently carry and gate signals alternated in the output of each stage. The effect of this novel output pulse selection arrangement is graphically illustrated in Fig. 3. Thus, on the first line in Fig. 3, there are shown thirty-two consecutive multiplicand input pulse representations corresponding to an X of thirty-two input events. Assuming now that these are applied to input terminal 11 of Fig. 1, and based upon the previous discussion of Fig. 2, stage 1 of counter 13 will yield as one output, a sequence of 16 carries, and as a second output, a sequence of 16 alternately spaced signals for application to gate G-1. Thus there are 16 carry and 16 output pulses for gate operation which occur in mutually exclusive time intervals.

Counter stage 2 responds only to each pair of carry pulses from stage 1 to yield in turn one carry to counter stage 3 and one significant pulse to gate G-2. In a similar manner stages 3, 4, 5 . . . n, each respond to two pulses from the next preceding stage to furnish one pulse to the respective gate and one carry pulse to the next stage. In Fig. 3, the effect of this arrangement is shown for the first five stages, the carry outputs and the outputs to the gates being shown on the same time scale. It may now be observed that no output pulse shown falls in time coincidence with any other counter stage output pulse. On the other hand carry outputs are quite frequently coincident in time, but the carry pulses do not pass through the gates and buffers to contribute to the final system output. Although the principle that no two outputs may occur simultaneously has been demonstrated for five stages only, it is effective for any number of counter stages used in the multiplier.

To illustrate system operation by reference to a specific example, assume that the binary number representing Y is 010110000, only terminals $Y_2$, $Y_4$ and $Y_5$ will be energized to open the associated gates G-2, G-4 and G-5, to couple output pulses to terminal 15. Utilizing the equation $$Y = \sum_1^n \frac{Y_n}{2^n}$$

Y in this example is $$0 + \frac{1}{2^2} + 0 + \frac{1}{2^4} + \frac{1}{2^5} + 0 + 0 + 0 + 0$$

or 11/32, expressed as a fraction.

Since only the second, fourth, and fifth digits of the binary number are one, only output pulses from counter stages 2, 4 and 5 in Fig. 1 will be coupled to output terminal 15. With reference to Fig. 3, if the output pulses shown for stages 2, 4 and 5 are selected for the interval fixed by the thirty-two input pulses on the first line, eleven output pulses, as shown in the lowermost line will be provided on terminal 15 in the sequence indicated. Note then that the input was the quantity thirty-two, represented by the thirty-two input pulses for a given time, the multiplier was 11/32 set up in binary form on the Y terminals, and the product output XY was eleven, represented by eleven output pulses occurring within the same time period and appearing at terminal 15.

It will also be observed that this interlaced pulse timing relationship is wholly independent of the frequency of input multiplicand pulses. In other words, no particular time spacing pattern is required of the input pulses in order to insure that the summation provided at terminal 15 does not include two pulses which have occurred simultaneously.

The novel technique just described for obtaining an interlaced timing pattern is highly dependable and economical. However, if preferred, the carry pulse between stages could be used to actuate the gates, provided, however, that auxiliary delay devices were inserted between each counter stage and gate circuit. That is to say, if a more conventional type of counter were employed, an array of delay circuits could be employed to generate the interlaced timing pattern shown in Fig. 3.

From a consideration of the system details set forth above, it will now be apparent that the multiplier discussed is of general application and that it may be adapted to specific waveforms and input signals simply by appropriately changing the nature of counter or gates. The specific gating technique illustrated in Fig. 2 is, of course, not the only coincidence gate array usable, but the illustrated circuit has the advantage that light weight reliability and compactness may be achieved using semi-conductor components such as crystal diodes. Numerous types of binary counters are available and most of these may be adapted as shown in Fig. 2 to provide the necessary interlaced timing pattern without auxiliary components.

Although an electron tube flip-flop capable of operation at exceptionally high counting speeds has been described, there are available other types which have the advantage of less weight and greater durability. Among these are magnetic type counters and variations which include combinations of magnetic elements and transistor components. The specific design chosen will, of course, depend upon the nature of the signals involved and the ultimate cost aspects thereof.

With the invention described as embodied in a particular form, it will be apparent that numerous modifications and departures may now be made by those skilled in this electrical computation and other arts. Consequently, the invention herein is to be construed as limited only by the spirit and scope of the appended claims.

What is claimed is:

1. Computation apparatus comprising, a multi-stage cascade counter, means for applying a pulsed signal having a rate characteristic of a first quantity to the input of the first of said counter stages, each counter stage delivering output and carry pulses and having an input energized by carry pulses from the preceding stage and an output providing a lesser number of output pulses than the preceding stage in said counter, means for selecting said output and carry pulses from a stage at the same rate but at different times, gate circuits respectively coupled to the output of each of said counter stages, means for controlling the response of each gate circuit in accordance with a binary number signal representative of a second quantity, and buffer means for combining the outputs of said gate circuits to provide an output pulse train having a rate characteristic of the product of said first and second quantities.

2. A multiplier comprising, $n$ cascaded binary counter stages, where $n$ is an integer, means for applying a pulsed signal having a rate characteristic of a first quantity to the input of the first of said cascaded binary counter stages, each of said counter stages delivering output and carry pulses and having an input energized by carry pulses from the preceding stage and an output providing a lesser number of output pulses than the preceding stage, $n$ gate circuits each associated with a corresponding counter stage and having first and second inputs and providing a single output when said inputs are substantially simultaneously activated, means coupling the output of each of said counter stages to the first input of the respective gate circuit, means for impressing a signal representing a binary number on said gate circuit second inputs, whereby a gate circuit selectively energized by said binary number signal couples said associated binary counter stage output pulses to said gate circuit output, an output terminal, and means for delivering to said output terminal all of said output pulses coupled to gate circuit outputs, all of the latter pulses being delivered to said output terminal during mutually exclusive times.

3. Apparatus as in claim 2 and including buffer means for combining the outputs of said $n$ gate circuits whereby a signal representation is provided of the product of a quantity represented by said binary number signal and a signal applied to said binary counter.

4. Apparatus as in claim 2 and including $n$ buffer circuits having a common output load circuit, the input of each buffer circuit being coupled to the output of a respective gate circuit.

5. Computation apparatus comprising, a counter having a plurality of cascaded flip-flop binary counter stages, means for energizing said counter with a first input signal wherein information is represented as a number of occurrences in a predetermined unit of time, means in each flip-flop counter stage for propagating carry signals to the following stage, means in each flip-flop counter stage for providing count signals related proportionately to said number of occurrences and arranged as to preclude simultaneous occurrence of said count signals, each of said binary counter stages providing fewer count signals than the preceding stage, a gate circuit for each of said counter stages, means for selectively activating said gate circuits in accordance with a second electrical input signal representing a number in parallel binary notation; and buffer means for combining the outputs of said gate circuits, thereby providing an output signal having a number of occurrences in said predetermined time unit equal to the number of occurrences in said first input signal during the corresponding time unit multiplied by said number represented by said second input signal.

6. A multiplier comprising, a multi-stage cascaded counter, means for applying a first signal to said counter having a number of impulses per unit time characteristic of a first quantity, each of said counter stages providing smaller numbers of output pulses per unit time than the preceding stage, a plurality of gate circuits each corresponding to a digit of different significance in a binary number and energized by said output pulses from a respective one of said counter stages, means for applying a gate conditioning signal to a respective gate circuit only when the binary digit of corresponding significance in said binary number is a first of the two binary values, each of said gate circuits being responsive to the substantially simultaneous application of said output signals and said gate conditioning signal to provide output impulses occurring during mutually exclusive time intervals, an output terminal, and means for coupling all said output impulses to said output terminal.

7. A multiplier comprising, a multi-stage cascaded counter, means for applying a first signal to said counter having a number of impulses per unit time characteristic of a first quantity, each counter stage providing output and carry pulses during mutually exclusive time intervals, a plurality of gate circuits each corresponding to a digit of different significance in a binary number and energized by said output pulses from a respective one of said counter stages, means for applying a gate conditioning signal to a respective gate circuit only when the binary digit of corresponding significance in said binary number is a first of the two binary values, each of said gate circuits being responsive to the substantially simultaneous application of said output signals and said gate conditioning signal to provide output impulses; means for applying said carry pulses to the input of a following stage to advance the count therein, an output terminal, and means for coupling all said output impulses to said output terminal to provide an output signal having a number of impulses per unit time representative of the product of said first quantity with said binary number.

8. Apparatus for providing an output signal having a number of impulses per unit time characteristic of the product of a first quantity represented by the impulses per unit time of an input signal and a number represented by a plurality of digit signals each of which may assume first and second values corresponding to respective bit values indicative of said number in binary notation comprising, means responsive to said input signal impulses for providing gating impulses occurring during mutually exclusive time intervals, respective gating means associated with each of said digit signals and responding to predetermined ones of said gating impulses only when the respective digit signal is said first value by providing gated impulses spaced in time from all others of said gated impulses, an output terminal, and means for coupling all said gated impulses to said output terminal, said predetermined ones of said gating impulses being characteristic of the significance of the bit corresponding to the respective digit signals.

References Cited in the file of this patent

UNITED STATES PATENTS

| | | |
|---|---|---|
| 2,568,724 | Earp et al. | Sept. 25, 1951 |
| 2,590,110 | Lippel | Mar. 25, 1952 |
| 2,634,052 | Bloch | Apr. 7, 1953 |
| 2,641,740 | Levy | June 9, 1953 |
| 2,672,283 | Havens | Mar. 16, 1954 |
| 2,674,727 | Spielberg | Apr. 6, 1954 |
| 2,685,407 | Robinson | Aug. 3, 1954 |
| 2,700,504 | Thomas | Jan. 25, 1955 |
| 2,714,658 | Greenfield | Aug. 2, 1955 |
| 2,715,678 | Barney | Aug. 16, 1955 |
| 2,764,343 | Diener | Sept. 25, 1956 |